United States Patent
Kwan et al.

(10) Patent No.: US 9,882,302 B2
(45) Date of Patent: Jan. 30, 2018

(54) ENCLOSURES HAVING A SEAMLESS APPEARANCE

(71) Applicant: APPLE INC., Cupertino, CA (US)

(72) Inventors: Alexander M. Kwan, Los Altos, CA (US); Cesar Lozano Villarreal, Sunnyvale, CA (US); Siri Amrit Ramos, San Francisco, CA (US); Xuyang Zhang, San Jose, CA (US); Peter A. Dvorak, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/282,750

(22) Filed: Sep. 30, 2016

(65) Prior Publication Data

US 2017/0093077 A1    Mar. 30, 2017

Related U.S. Application Data

(60) Provisional application No. 62/235,430, filed on Sep. 30, 2015.

(51) Int. Cl.
| | | |
|---|---|---|
| *H01R 13/504* | (2006.01) | |
| *H01R 13/66* | (2006.01) | |
| *H01R 43/18* | (2006.01) | |
| *B29C 65/00* | (2006.01) | |
| *H01R 27/02* | (2006.01) | |
| *H01R 13/52* | (2006.01) | |

(52) U.S. Cl.
CPC ........ *H01R 13/504* (2013.01); *B29C 66/1162* (2013.01); *B29C 66/1226* (2013.01); *H01R 13/665* (2013.01); *H01R 27/02* (2013.01); *H01R 43/18* (2013.01); *B29C 66/124* (2013.01); *H01R 13/5045* (2013.01); *H01R 13/521* (2013.01)

(58) Field of Classification Search
CPC H01R 13/6205; H01R 2107/00; H01R 24/60; H01R 27/02; H01R 13/24; H01R 13/405; H01R 13/642; H01R 13/659; H01R 13/6675; H01R 13/7038; H01R 13/7135; H01R 13/72; H01R 2103/00; H01R 2201/16

See application file for complete search history.

(56) References Cited

U.S. PATENT DOCUMENTS 3,753,211 A * 8/1973 Pauza .................. H05K 7/1076
439/264
5,100,346 A * 3/1992 McCardell ............ H01R 13/111
439/595

(Continued)

FOREIGN PATENT DOCUMENTS

| AU | 517985 B1 | 9/1981 |
| WO | 2017059311 A1 | 4/2017 |

OTHER PUBLICATIONS

International Search Report and Written Opinion for PCT Application No. PCT/US2016/054908 in 12 pages.

*Primary Examiner* — Truc Nguyen
(74) *Attorney, Agent, or Firm* — Kilpatrick Townsend and Stockton, LLP

(57) ABSTRACT

An enclosure for an AC to DC adapter has a continuous and apparently seamless exterior surface. The enclosure includes a housing and a cap that are joined by a pair of weld joints. One weld is formed on an interior portion of the enclosure providing strength and one weld joint is formed on the exterior surface providing a seamless appearance for the enclosure.

22 Claims, 9 Drawing Sheets

(56) References Cited

U.S. PATENT DOCUMENTS

| | | | |
|---|---|---|---|
| 5,681,409 A | 10/1997 | Lin et al. | |
| 5,863,364 A | 1/1999 | Lin et al. | |
| 6,649,838 B1* | 11/2003 | Lopez, Sr. | H02G 3/14 174/66 |
| 6,848,946 B2* | 2/2005 | Vicenza | B60R 16/0238 439/620.29 |
| 6,926,540 B1* | 8/2005 | Juntwait | H01R 12/585 439/276 |
| 7,445,509 B2* | 11/2008 | Korczynski | H01R 13/68 439/620.26 |
| 7,947,901 B2* | 5/2011 | Leopold | H02G 3/088 174/50 |
| 8,708,722 B1* | 4/2014 | Walliser | H01R 13/6675 439/172 |
| 8,944,857 B2 | 2/2015 | Mariano et al. | |
| 9,362,765 B1* | 6/2016 | Blaszczak | H01R 31/065 |
| 2003/0186564 A1* | 10/2003 | Rhude | H01R 13/60 439/35 |
| 2009/0029603 A1 | 1/2009 | Tokairin | |
| 2010/0173532 A1* | 7/2010 | Czyz | B60R 16/04 439/709 |
| 2011/0223806 A1* | 9/2011 | You | H01R 13/6658 439/620.22 |
| 2012/0231657 A1* | 9/2012 | Bouse | H02G 3/185 439/535 |
| 2013/0078853 A1* | 3/2013 | Dinh | H02G 3/088 439/535 |
| 2014/0162480 A1* | 6/2014 | Schutte | H01R 13/447 439/142 |
| 2014/0263869 A1* | 9/2014 | Clark-Mantle | H02G 3/086 248/65 |
| 2014/0308853 A1 | 10/2014 | Colahan et al. | |

\* cited by examiner

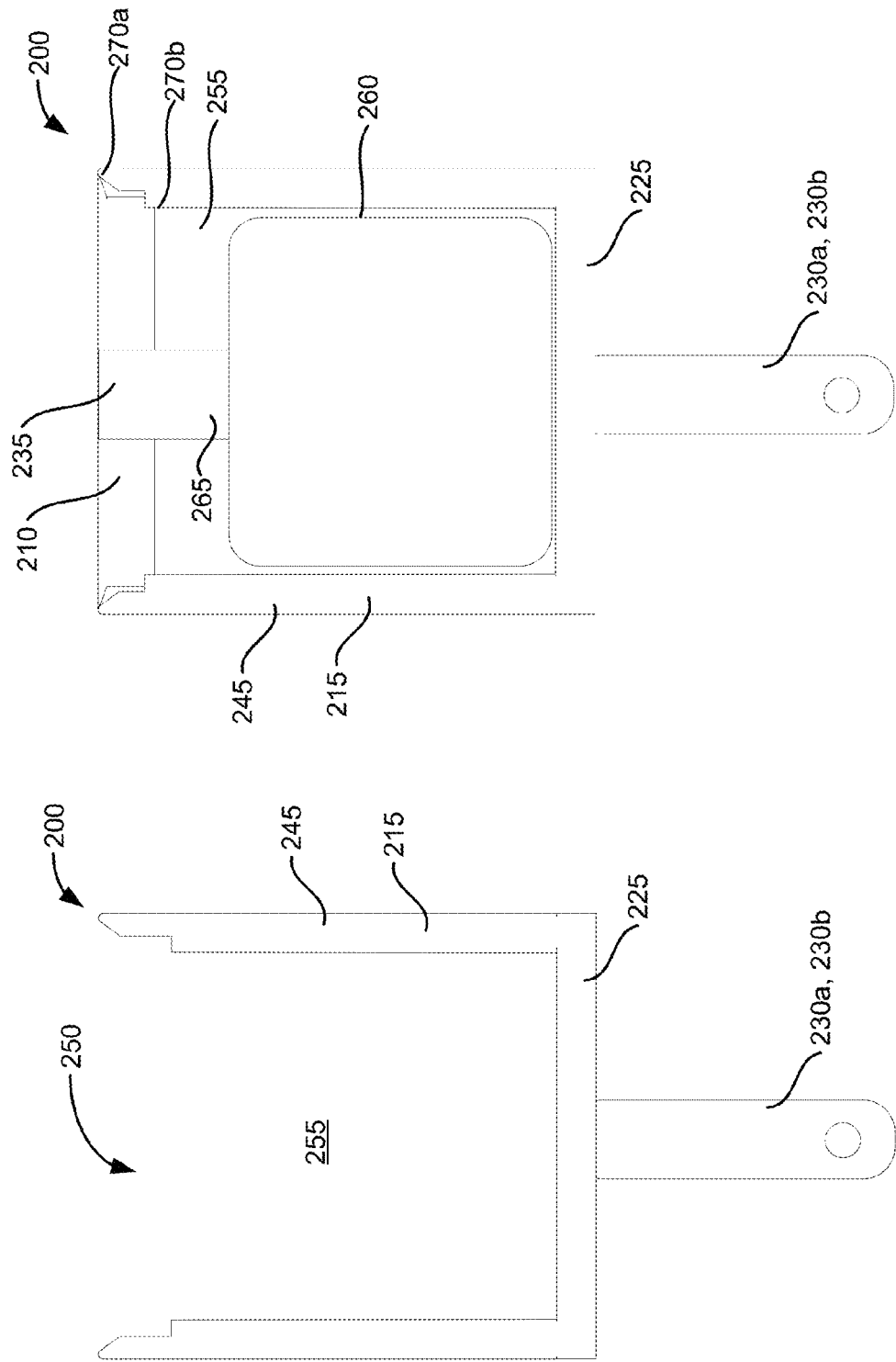

ENCLOSURES HAVING A SEAMLESS APPEARANCE

CROSS-REFERENCES TO RELATED APPLICATIONS

This application claims priority to U.S. Provisional Application 62/235,430 filed on Sep. 30, 2015, entitled "Corner-Angled Reveal for Electronic Enclosure", which is incorporated by reference in its entirety and for all purposes.

FIELD

The described embodiments relate generally to enclosures that have the appearance of being seamless. More particularly, the present embodiments relate to plastic enclosures that appear seamless and house one or more electronics assemblies.

BACKGROUND

Currently there are a wide variety of electronic devices that have enclosures to facilitate the use of the electronic device and provide an aesthetic appearance. However, often such enclosures have one or more seams where plastic components of the enclosure meet. The seams can disrupt the exterior surface of the enclosure impairing its aesthetics and sometimes creating a relatively weak region of the enclosure that is prone to damage and breakage. This can be particularly problematic for enclosures that contain high-voltage electronic components that would be exposed if such a seam were to be broken. New enclosures are needed for electronic assemblies that are seamless, or at least have the appearance of being seamless, and/or that have improved structural integrity.

SUMMARY

Some embodiments of the present disclosure relate to enclosures having a seamless look and feel that are used to encase an electronic assembly. Some embodiments relate to an enclosure that can be used for any electronic device while other embodiments relate to an enclosure for an AC to DC adapter.

In some embodiments an enclosure for an electronic assembly has a seamless exterior appearance and comprises a housing including a bottom wall and at least one side wall extending from the bottom wall. The at least one side wall comprises a beveled end portion having a curved tip. A cap comprising a protrusion is coupled to the beveled end portion of the housing, wherein the cap, the bottom wall, and the at least one side wall define a cavity in which the electronic assembly is disposed. At least two electrical prongs are disposed through the bottom wall and are electrically coupled to the electronic assembly.

In some embodiments the cap is coupled to the at least one side wall with a first and a second weld joint. In various embodiments the first and the second weld joints are separated by a distance and have a non-interference region between them. In some embodiments the beveled end portion and the protrusion define the non-interference region with a pair of sloped surfaces.

In some embodiments the pair of sloped surfaces are both at an angle between 30 and 40 degrees. In various embodiments the first weld joint is formed between the protrusion and the beveled end portion. In some embodiments the second weld joint is formed within an interference region disposed between the side wall and the cap. In various embodiments the first and the second weld joints are ultrasonically formed welds.

In some embodiments at least a portion of a top surface of the cap is proud with respect to the curved tip of the beveled end portion. In various embodiments a top surface of the cap is formed with a matte surface.

In some embodiments a method of forming an enclosure having a seamless exterior appearance for an electronic assembly is disclosed, the method comprises forming a housing having a bottom wall and at least one side wall extending from the bottom wall. The at least one side wall comprises a beveled end portion having a curved tip, and the bottom wall is formed around at least two electrical prongs extending through the bottom wall. An electronic assembly is disposed within the housing such that the electrical assembly is electrically coupled to the at least two electrical prongs. A cap comprising a protrusion is positioned on the housing, and the protrusion is coupled to the beveled end portion. The cap, the bottom wall, and the at least one side wall define a cavity in which the electronic assembly is disposed.

In some embodiments the protrusion is coupled to the beveled end portion with a first and a second joint. In various embodiments the first and the second joints are formed by ultrasonic welding. In some embodiments the second joint is formed by shear forces acting on an interference region disposed between the side wall and the cap. In various embodiments the second joint is formed by compression forces acting on an interference region disposed between the side wall and the cap.

In some embodiments the first joint is formed by ultrasonic welding and the second joint is formed with an adhesive. In various embodiments the first and the second joints are separated by a distance and have a non-interference region between them. In some embodiments the beveled end portion and the protrusion define the non-interference region with a pair of sloped surfaces. In various embodiments the pair of sloped surfaces are both at an angle between 30 and 40 degrees. In some embodiments at least a portion of a top surface of the cap is proud with respect to the curved tip of the beveled end portion.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 2B is a cross-sectional view of a housing for the AC to DC adapter illustrated in FIG. 2A;

FIG. 2C is a cross-sectional view of a housing including an electronic assembly for the AC to DC adapter illustrated in FIG. 2A;

DETAILED DESCRIPTION

Some embodiments of the present disclosure relate to electronic devices that have a plastic enclosure that has the appearance and feel of not including any seams (e.g., having an apparently seamless enclosure). Various embodiments relate to enclosures that can also have improved structural integrity at the enclosure edges and/or resiliency to water or dust penetration. While the present disclosure can be useful for a wide variety of configurations, some embodiments of the disclosure are particularly useful for high voltage electronic assemblies encased in plastic enclosures, as described in more detail below.

For example, in some embodiments an injection molded plastic housing is formed having a cavity configured to receive an electronics assembly. A cap is secured to the housing over the cavity forming a visually continuous exterior surface at seams where the housing and cap meet. In one embodiment the housing encases and forms a liquid-tight enclosure for an underwater diving device.

In another example an injection molded plastic housing is formed with a cavity and a pair of AC wall adapter prongs that extend out of a face of the housing. An AC to DC converter assembly that includes high voltage circuitry is installed within the cavity and coupled to the prongs. A cap is installed over the cavity, forming a visually continuous exterior surface at the seams where the cap meets the housing. The cap has an aperture through which a DC connector can be coupled to the AC to DC converter.

In order to better appreciate the features and aspects of housings having a seamless appearance according to the present disclosure, further context for the disclosure is provided in the following section by discussing two particular implementations of electronic devices according to embodiments of the present disclosure. These embodiments are for example only and other embodiments can be employed in other electronic devices such as, but not limited to computers, watches, media players, RFID tags and other devices.

Figure 1:
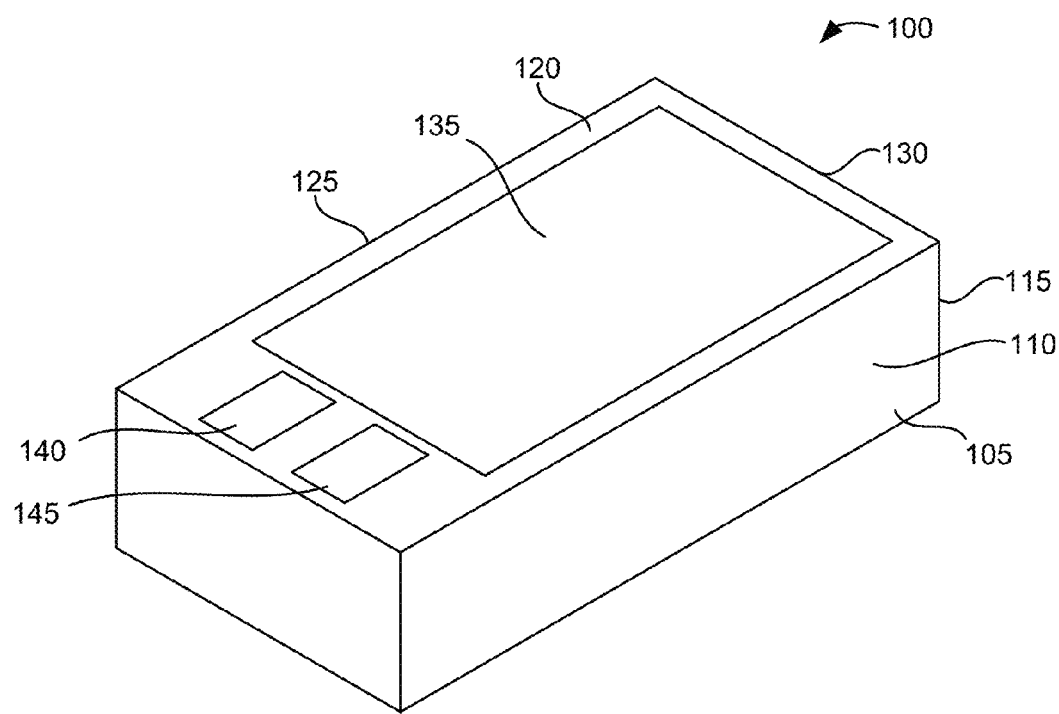
FIG. 1 is a front perspective view of an electronic device having a visually continuous exterior surface according to an embodiment of the disclosure.

FIG. 1 illustrates a simplified perspective view of an electronic device 100 according to some embodiments of the disclosure. As shown in FIG. 1, electronic device 100 has an enclosure 105 with a visually continuous exterior surface 110 having the appearance and feel of being seamless. More specifically, enclosure 105 includes a housing 115 and a cap 120 that are visually continuous at a seam 125 where the housing and cap meet. The seamless appearance can be aesthetically pleasing, and can also provide resilience to dust and liquid penetration. Further, seam 125 can be imperceptible to a user's touch giving electronic device 100 a smooth monolithic feel. In some embodiments seam 125 can be formed to have sufficient mechanical strength so that cap 120 cannot be easily separated from housing 115 and edges 130 of enclosure 105 resist fracturing.

In the embodiment shown in FIG. 1, enclosure 105 is illustrated as including a display 135 (e.g, a touch display) and first and second input buttons 140, 145. Embodiments of the disclosure are not limited to any particular electronic device, however, and in other embodiments enclosure 105 can be used for devices that have different components than what is shown in FIG. 1. The seamless appearance of enclosure 105 can be both aesthetically pleasing and useful to make enclosure 105 liquid-tight. Since enclosure 105 has an undisrupted exterior surface, in some embodiments the electronic assembly within the enclosure can be inductively charged with an external and separate inductive charging station. In further embodiments enclosure 105 can have a battery or other power source within it.

In various embodiments enclosure 105 can be used to enclose other electronics assemblies such as, but not limited to a wireless communication transceiver, a wireless router, an RFID device, a wirelessly activated tag for locating lost keys or an AC to DC adapter, as explained in more detail below. In some particular embodiments enclosure 105 can be part of a device that includes wireless transceiver, a rechargeable battery and a wireless charging interface to charge the battery and not include any external connectors reducing possible paths of ingress for water or other moisture. In further embodiments, enclosure 105 can be used for purposes other than enclosing an electronic device. In one example, enclosure 105 can be used to enclose an antique (e.g., a coin or a piece of ancient artwork) that needs to protected from damage and have an aesthetically appealing appearance.

As defined herein, liquid-tight shall mean a seal that conforms to one or more of the following ratings as defined by the International Protection Rating and International Electrochemical Commission (IEC) 60529 that can also be known as the I.P. 68 rating. In some embodiments the liquid-tight seal will protect the electronic assembly against the harmful ingress of water and have a "liquid ingress" rating between 1 (dripping water) and 8 (immersion beyond 1 meter). In various embodiments the liquid-tight seal shall be rated between 1 (dripping water) and 4 (splashing water) while in some embodiments the liquid-tight seal shall be rated between 2 (dripping water with device tilted at 15 degrees) and 5 (water jet). In various embodiments the liquid-tight seal shall be rated between 3 (spraying water) and 6 (powerful water jets) while in some embodiments the liquid-tight seal shall be rated between 4 (splashing water) and 7 (immersion up to 1 meter). In various embodiments the liquid-tight seal shall be rated between 5 (water jets) and 8 (immersion beyond 1 meter) while in some embodiments liquid-tight shall mean the seal will protect the electronic device against liquid ingress up to 100 feet for 30 minutes.

Figure 2A:
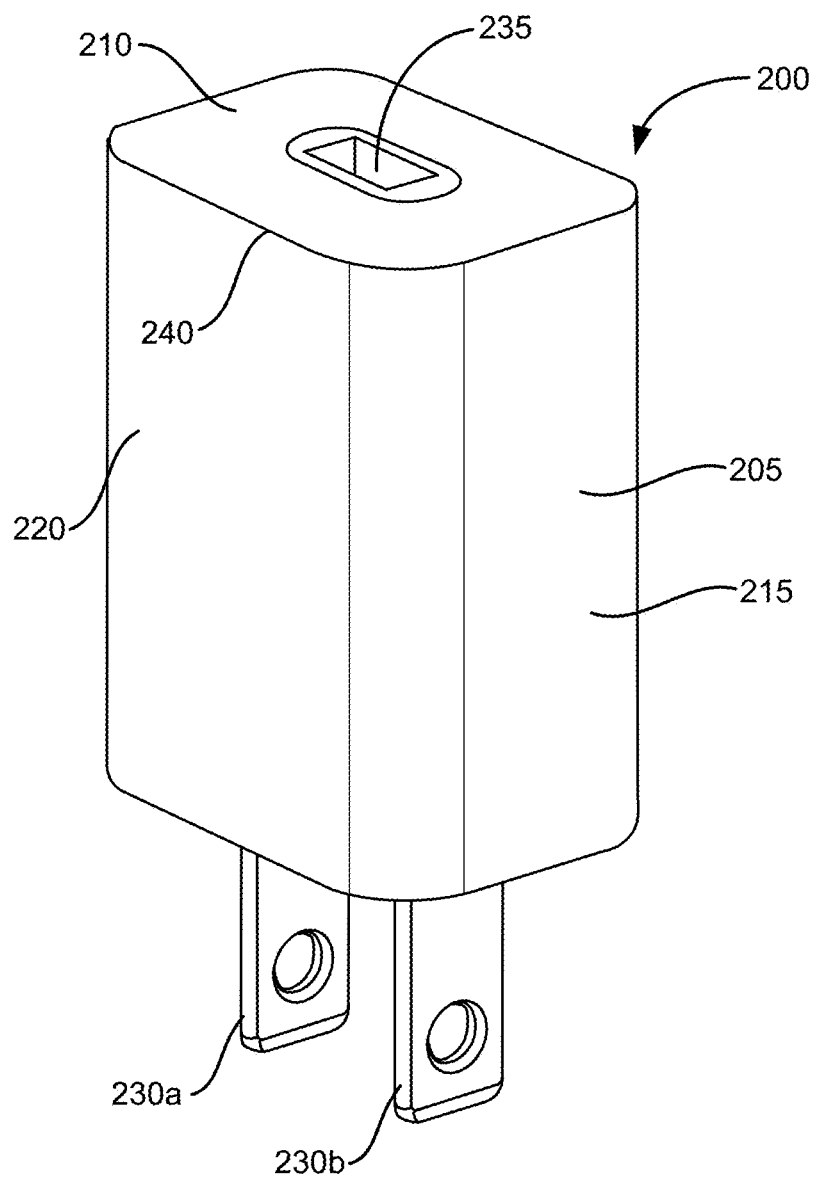
FIG. 2A is a front perspective view of an AC to DC adapter having a visually continuous exterior surface according to an embodiment of the disclosure.

Now referring to FIG. 2A a simplified perspective view of an electronic device 200 having a seamless appearance is illustrated. As shown in FIG. 2A, electronic device 200 can be an AC to DC adapter that includes an enclosure 205 having a cap 210 secured to a housing 215 forming a visually continuous exterior surface 220. In this embodiment, enclosure 205 encases an AC to DC electronics assembly (not shown in FIG. 2A), as discussed in more detail below.

Electronic device 200 has a pair of electrical prongs 230a, 230b that are configured to be plugged into an AC wall outlet to receive AC power. A receiving opening 235 is configured to receive a connector that can couple DC energy to a separate electronic device. In some embodiments continuous exterior surface 220 can provide device 200 with a pleasing feel for a user since housing 215 is not distinguishable from cap 210 by touch. In further embodiments seams 240 formed between cap 210 and housing 215, can be configured to provide improved structural integrity such that enclosure 205 is able to withstand high mechanical forces.

FIGS. 2A-2B illustrate sequential steps of forming electronic device 200. FIG. 2B illustrates a cross-sectional view of housing 215. Housing 215 can have a bottom wall 225 and at least one side wall 245 extending between bottom wall 225 and an opening 250, forming a cavity 255. In the example illustrated in FIG. 2A, there can be four sidewalls or, alternatively, housing 215 can be cylindrically shaped such that side wall 245 has a round cross section. Bottom wall 225 can be formed around at least two electrical prongs 230a, 230b that are disposed through bottom wall 225 (the second prong is disposed directly behind the prong illustrated in FIG. 2A). More specifically, in some embodiments two electrical prongs 230a, 230b can be insert molded within housing 215. In other embodiments at least two electrical prongs 230a, 230b can be inserted after the formation of housing 215. Bottom wall 225 and side wall 245 can be formed of plastic, such as a polycarbonate, and can be fabricated with an injection molding machine. In one embodiment the polycarbonate material can be unfilled, while in other embodiments it can have between 1 percent and 20 percent glass fiber or other reinforcement.

Now referring to FIG. 2C, an electronic assembly 260 including AC to DC power conversion circuitry has been inserted within cavity 255 and electrically coupled to at least two electrical prongs 230a, 230b. A connector 265 can extend out of electronic assembly 260 and be used to supply DC power to a separate electronic device. In some embodiments, connector 265 can be a USB or other type of electrical connector, such as, but not limited to a USB Type-A connector, a USB micro connector or a USB Type-C connector. As further shown in FIG. 2B, cap 210 can be installed onto housing 215. Cap 210 can be formed of the same material as housing 215 using an injection molding machine. For example, cap 210 can be formed of plastic, such as a filled or unfilled polycarbonate. Cap 210 can include an opening 235 (see FIG. 2A) aligned with connector 265. Opening 235 can be dimensioned to allow a connector to be inserted through the opening such that it can be coupled to connector 265.

Cap 210 can be coupled to housing 215 using any suitable process. In some embodiments, an ultrasonic welding process can be used. Ultrasonic welding involves applying high-frequency (e.g., 20,000 Hz) ultrasonic acoustic vibrations to work pieces being held together under pressure to create a solid-state weld. To install cap 210 onto housing 215 as shown in FIG. 2B, cap 210 can be positioned on housing 215 followed by an application of force (i.e. towards bottom wall 225) in combination with the ultrasonic vibrations. The vibrations cause heat to be generated at the interfaces where cap 210 and housing 215 are in contact with each other as a result of the applied force. The heat causes localized regions of cap 210 and housing 215 to melt and form weld joints 270a, 270b (or "interferences") as discussed in more detail below.

In order for enclosure 205 to have the appearance of being continuous and seamless, weld joint 270a can be formed to be substantially imperceptible. Weld joints 270a, 270b should also be strong to prevent fracture or other mechanical failure resulting in cap 210 being decoupled from housing 215. The desired strength and continuous appearance of enclosure 205 can be accomplished by molding cap 210 and housing 215 in particular geometries. Exemplary geometries are shown in FIGS. 3-6 which illustrate expanded views of the regions of cap 210 and housing 215 at weld joints 270a, 270b.

Figure 3:
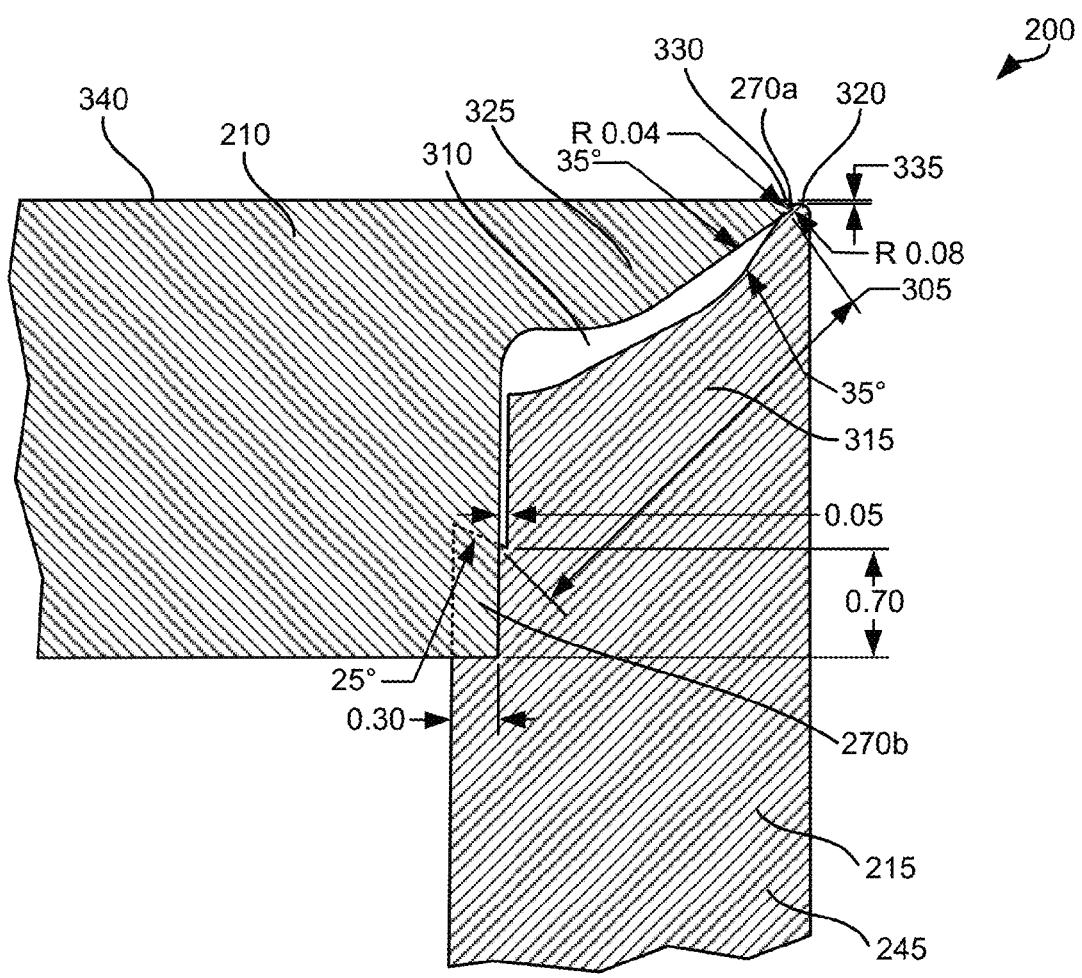
FIG. 3 is a cross-sectional view of an interface between the housing and the cap portions of the enclosure illustrated in FIG. 2A.

FIG. 3 illustrates a close-up cross-sectional view of one embodiment of cap 210 and housing 215 at weld joints 270a, 270b. As shown in FIG. 3, weld joints 270a and 270b are separated by a distance 305 and have a non-interference region 310 between them formed by a pair of sloped surfaces. More specifically, FIG. 3 illustrates weld joints 270a, 270b after ultrasonic welding has taken place. Dashed lines in regions of weld joints 270a, 270b illustrate pre-weld interference areas that have been melted and deformed to form the weld joints.

Sidewall 245 of housing 215 can include a beveled end portion 315 having a curved tip 320. The cross-section of beveled end portion 315 shown in FIG. 3 can be characterized by any suitable angle. In some embodiments, beveled end portion 315 can form an angle between 30° and 40° and in one embodiment about 35°. Curved tip 320 can also have any suitable radius of curvature. In some embodiments curved tip 320 can have a radius of curvature of 0.08 millimeters.

As further shown in FIG. 3, cap 210 can include a protrusion 325. Protrusion 325 can have any suitable configuration. For example, in FIG. 3, protrusion 325 can extend to a point 330 such that the cross-section of protrusion 325 is characterized by an angle. In some embodiments, protrusion 325 can form an angle of about 35°. In some embodiments, point 330 can have a radius of curvature of about 0.04 millimeters.

Before ultrasonic welding, cap 210 can extend above sidewall 245 by 0.5 to 1.5 millimeters. However, after ultrasonic welding, cap 210 can extend above sidewall 245 by a protrusion distance 335. In some embodiments protrusion distance 335 is between 10 microns and 200 microns while in various embodiments it can be between 50 microns and 150 microns and in some embodiments between 50 microns and 100 microns. The radius of curvature of curved tip 320, protrusion 325 and the dimension of protrusion distance 335 can make joint 270a imperceptible both visually and to touch. For example, as a user runs their finger across top surface 340 of cap 210 and along sidewall 245 the user may not feel any discontinuities and cap and sidewall can feel as if they are a monolithic structure. In further embodiments, top surface 340 of cap 210 can be manufactured with a matte finish to further obscure joint 270a from visual or touch recognition. The matte finish can also be used to obscure a marred surface appearance that can be caused by the ultrasonic welding process.

Joint 270a can be formed from an interference between side wall 245 and cap 210 in a region that is between 0.25 and 0.35 millimeters wide and between 0.6 and 0.9 millimeters tall. Shear forces are placed on the interference region during ultrasonic bonding. A gap between side wall 245 and cap 210 that is about 0.05 millimeters can be formed annularly around the cap and immediately adjacent to weld 270b.

When coupling protrusion 325 to beveled end portion 315 using ultrasonic welding, cap 210 can be attached such that it is proud (e.g., extends above) with respect to curved tip 320. Such a configuration can account for deflection that can occur when force is applied to top surface 340 of cap 210. As force is applied to cap 210 during ultrasonic welding, protrusion 325 can be configured to deflect into non-interference region 310 rather than beveled end portion 315 of housing 215 deflecting. The configuration shown in FIG. 3 can result in protrusion 325 deflecting up towards curved tip 320. As shown in FIG. 3, after ultrasonic welding no gap is present between point 330 of cap 210 and curved tip 320 of housing 215, thereby creating a seamless appearance.

The deflection of protrusion 325 can result in top surface 340 of cap 210 being curved. For example, as protrusion 325 deflects upwards during ultrasonic welding, the central region of cap 210 may not deflect, creating a concave top surface. However, the radius of curvature of curved tip 320 can make such a curvature of cap 210 imperceptible both visually and to touch. For example, as a user runs their finger across the top surface of cap 210 and curved tip 320, the combined surfaces can feel continuous (e.g., seamless or monolithic). Further, to avoid deformation of protrusion 325 and curved tip 320 at weld joint 270a, the force and/or vibrations can be modified during ultrasonic welding. For example, vibrations can be applied as cap 210 is pushed downward towards housing 215 but only until point 330 contacts curved tip 320. When the contact is made, the vibrations can be turned off but the downward force maintained. If the plastic at point 330 and curved tip 320 is sufficiently melted, weld joint 270a can be formed without further vibrations and without deforming the visible portions of protrusion 325 and curved tip 320.

Using the process described above, weld joint 270b can be used primarily for structural and/or sealing purposes and weld joint 270a can be designed primarily for obscuring the weld joint so entire enclosure 205 appears seamless. Non-interference region 310 can be used to separate weld joint 270a from weld joint 270b so the ultrasonic energy is concentrated only on the two weld joints and weld joint 270a can be well-controlled such that it forms a seamless exterior appearance for enclosure 205.

Figure 4:
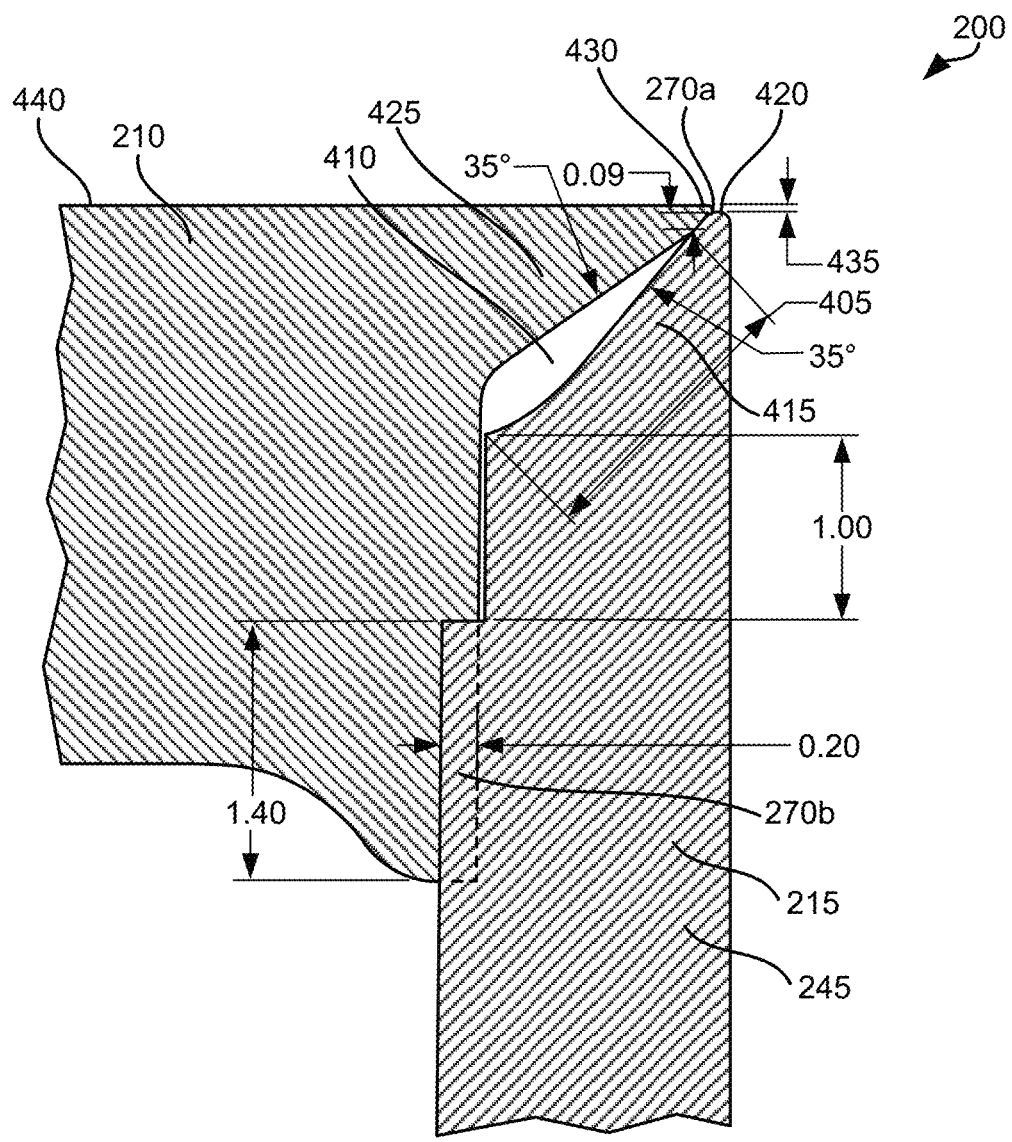
FIG. 4 is a cross-sectional view of an interface between the housing and the cap portions of the enclosure illustrated in FIG. 2A.

FIG. 4 illustrates a close-up cross-sectional view of another embodiment of cap 210 and housing 215 at weld joints 270a, 270b in accordance with various embodiments of the invention. As shown in FIG. 4, weld joints 270a and 270b are similar to those illustrated in FIG. 4 and are separated by a distance 405 with a non-interference region 410 between them. Dashed lines in regions of weld joints 270a, 270b illustrate pre-weld interference areas that have been melted and deformed to form the weld joints.

Sidewall 245 of housing 215 can include a beveled end portion 415 having a curved tip 420. The cross-section of beveled end portion 415 shown in FIG. 3 can be characterized by any suitable angle. In some embodiments, beveled end portion 415 can form an angle of about 35°. Curved tip 420 can also have any suitable radius of curvature. In some embodiments curved tip 420 can have a radius of curvature of 0.08 millimeters.

As further shown in FIG. 4, cap 210 can include a protrusion 425. Protrusion 425 can have any suitable configuration. For example, in FIG. 4, protrusion 425 can extend to a point 430 such that the cross-section of protrusion 425 is characterized by an angle. In some embodiments, protrusion 425 can form an angle of about 35°. In some embodiments, point 430 can have a radius of curvature of about 0.04 millimeters.

Before ultrasonic welding, cap 210 can extend above sidewall 245 between 1 to 2 millimeters. However, after ultrasonic welding, cap 210 can extend above sidewall 245 by a protrusion distance 435. In some embodiments protrusion distance 435 is between 10 microns and 200 microns while in various embodiments it can be between 20 microns and 50 microns and in some embodiments between 20 microns and 40 microns. The radius of curvature of curved tip 420, protrusion 425 and the dimension of protrusion distance 435 can make joint 270a imperceptible both visually and to touch. In further embodiments, top surface 440 of cap 210 can be manufactured with a matte finish to further obscure joint 270a from visual or touch recognition.

Joint 270b can be formed from an interference between side wall 245 and cap 210 in a region that is between 0.1 and 0.3 millimeters wide and between 1 and 2 millimeters tall. Shear forces are placed on the interference region during ultrasonic bonding. A gap between side wall 245 and cap 210 that is about 0.05 millimeters can be formed annularly around the cap and immediately adjacent to weld 270b.

As discussed above, weld joint 270b can be used primarily for structural and/or sealing purposes and weld joint 270a can be designed primarily for obscuring the weld joint so entire enclosure 205 appears seamless. Non-interference region 410 can be used to separate weld joint 270a from weld joint 270b so the ultrasonic energy is concentrated only on the two weld joints and weld joint 270a can be well-controlled such that it forms a seamless exterior appearance for enclosure 205.

Figure 5:
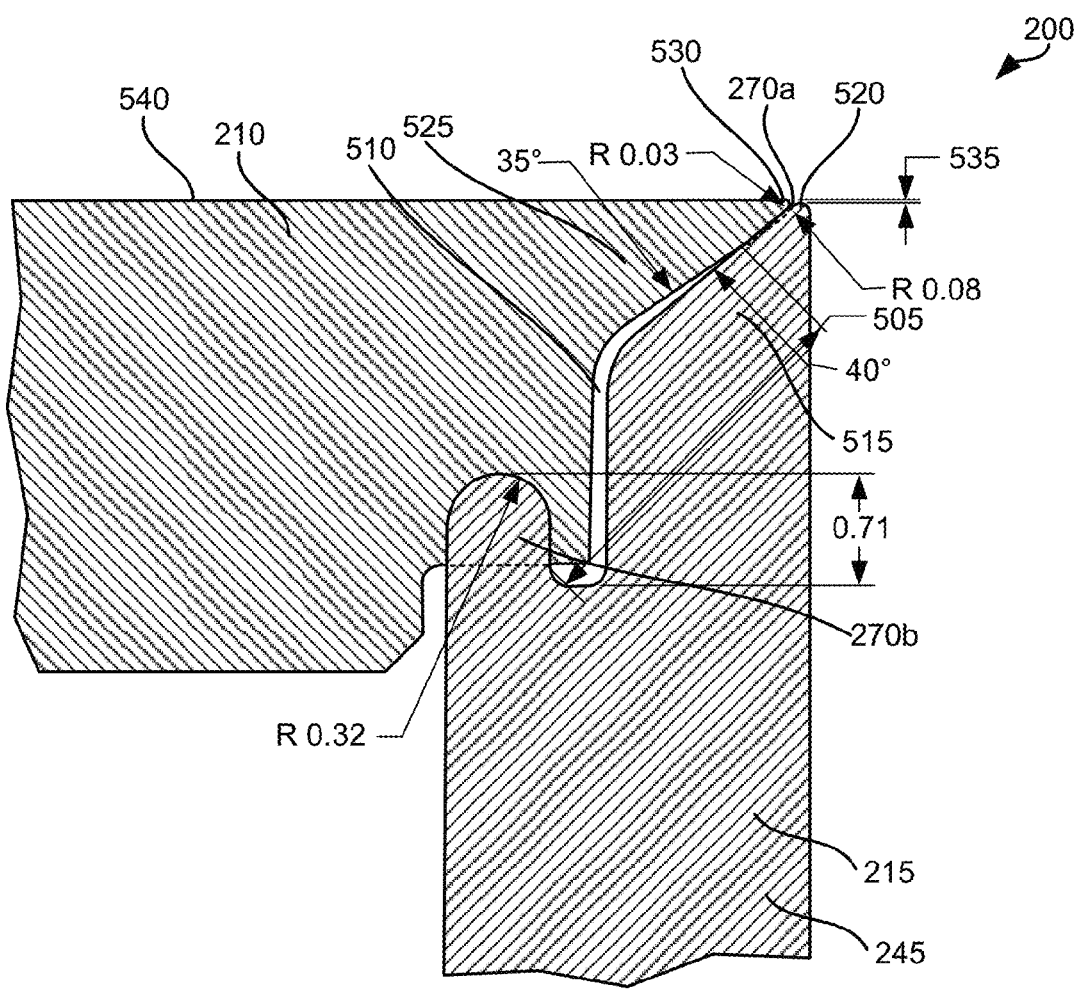
FIG. 5 is a cross-sectional view of an interface between the housing and the cap portions of the enclosure illustrated in FIG. 2A.

FIG. 5 illustrates a close-up cross-sectional view of another embodiment of cap 210 and housing 215 at weld joints 270a, 270b in accordance with various embodiments of the invention. As shown in FIG. 5, weld joints 270a and 270b are separated by a distance 405 with a non-interference region 410 between them and weld joint 270b is formed by compression bonding rather than shear bonding that was illustrated in FIGS. 3 and 4. Dashed lines in regions of weld joints 270a, 270b illustrate pre-weld interference areas that have been melted and deformed to form the weld joints.

Sidewall 245 of housing 215 can include a beveled end portion 515 having a curved tip 520. The cross-section of beveled end portion 515 shown in FIG. 5 can be characterized by any suitable angle. In some embodiments, beveled end portion 515 can form an angle of about 40°. Curved tip 520 can also have any suitable radius of curvature. In some embodiments curved tip 520 can have a radius of curvature of 0.08 millimeters.

As further shown in FIG. 5, cap 210 can include a protrusion 525. Protrusion 525 can have any suitable configuration. For example, in FIG.5, protrusion 525 can extend to a point 530 such that the cross-section of protrusion 525 is characterized by an angle. In some embodiments, protrusion 525 can form an angle of about 35°. In some embodiments, point 530 can have a radius of curvature of about 0.03 millimeters.

Before ultrasonic welding, cap 210 can extend above sidewall 245 between 0.5 to 1 millimeters. However, after ultrasonic welding, cap 210 can extend above sidewall 245 by a protrusion distance 535. In some embodiments protrusion distance 435 is between 5 microns and 200 microns while in various embodiments it can be between 5 microns and 20 microns and in some embodiments about 10 microns. The radius of curvature of curved tip 520, protrusion 525 and the dimension of protrusion distance 535 can make joint 270a imperceptible both visually and to touch. In further embodiments, top surface 540 of cap 210 can be manufactured with a matte finish to further obscure joint 270a from visual or touch recognition.

Joint 270b can be formed from an interference between side wall 245 and cap 210 in a region that extends up from the side wall between 1 to 2 millimeters and is between 0.2 and 0.5 millimeters wide. In one embodiment the interference has a radius of about 0.32 millimeters. Compression forces are placed on the interference region during ultrasonic bonding. A gap between side wall 245 and cap 210 that is about 0.05 millimeters can be formed annularly around the cap and immediately adjacent to weld 270b.

As discussed above, weld joint 270b can be used primarily for structural and/or sealing purposes and weld joint 270a can be designed primarily for obscuring the weld joint so entire enclosure 205 appears seamless. Non-interference region 510 can be used to separate weld joint 270a from weld joint 270b so the ultrasonic energy is concentrated only on the two weld joints and weld joint 270a can be well-controlled such that it forms a seamless exterior appearance for enclosure 205.

Figure 6:
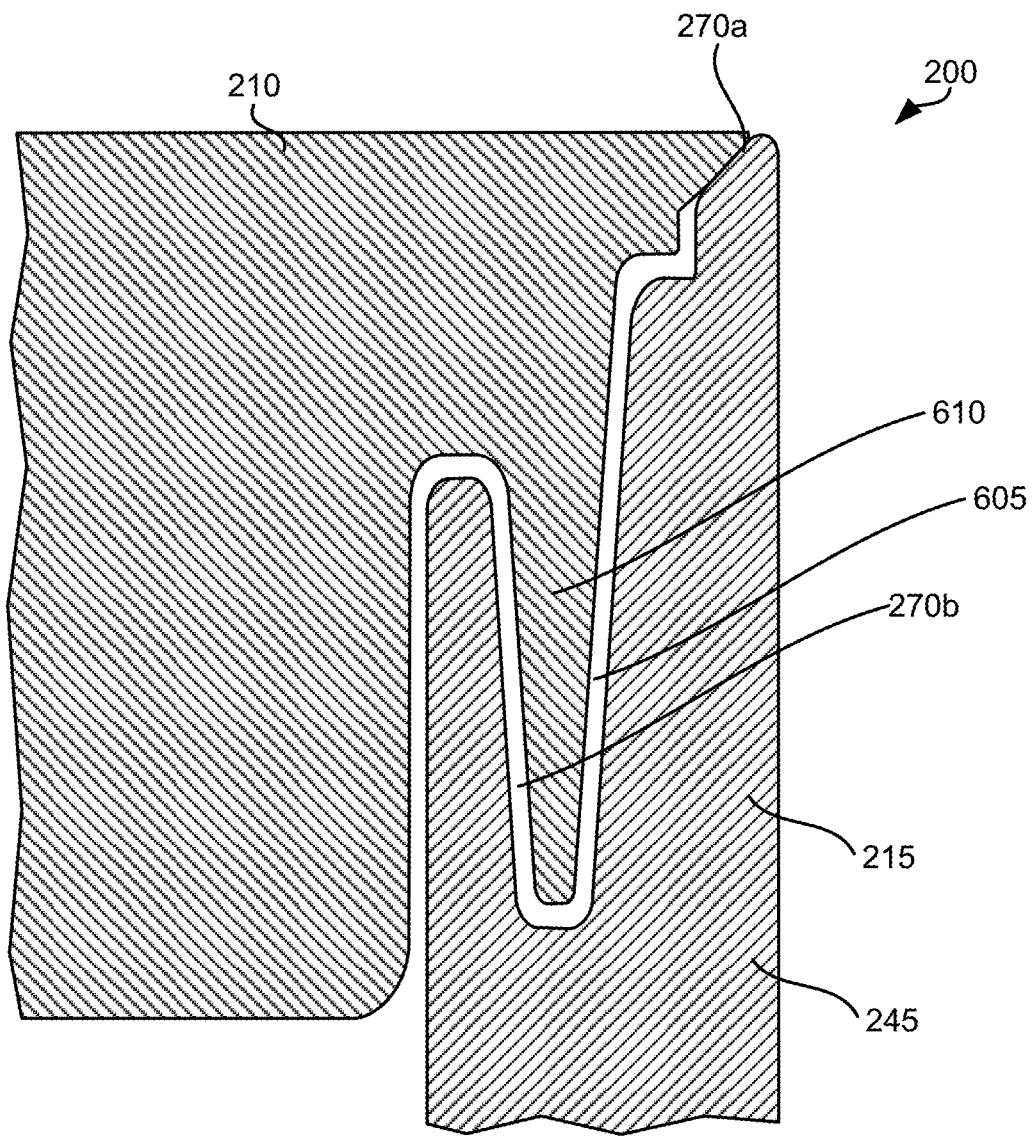
FIG. 6 is a cross-sectional view of an interface between the housing and the cap portions of the enclosure illustrated in FIG. 2A.

FIG. 6 illustrates a close-up cross-sectional view of another embodiment of cap 210 and housing 215 at weld joints 270a, 270b in accordance with various embodiments of the invention. FIG. 6 illustrates a "tongue and groove" configuration where side wall 245 of housing 215 includes a groove 605 and the bottom surface of cap 210 includes a tongue 610. Although weld joint 270a is formed using ultrasonic welding, weld joint 270b can be formed by either ultrasonic welding or with an adhesive. In some embodiments weld joint 270b is formed by applying an adhesive (e.g., an epoxy) to the groove of housing 215 and/or the tongue of cap 210. A downward force applied during ultrasonic bonding of weld joint 270a causes the tongue to be inserted into the groove which are then bonded upon drying (or curing) of the adhesive.

As discussed above, weld joint 270b can be used primarily for structural and/or sealing purposes and weld joint 270a can be designed primarily for obscuring the weld joint so entire enclosure 205 appears seamless. In some embodiments a non-interference region can be used to separate weld joint 270a from weld joint 270b, however in other embodiments a non-interference region may not be used.

Figure 7:
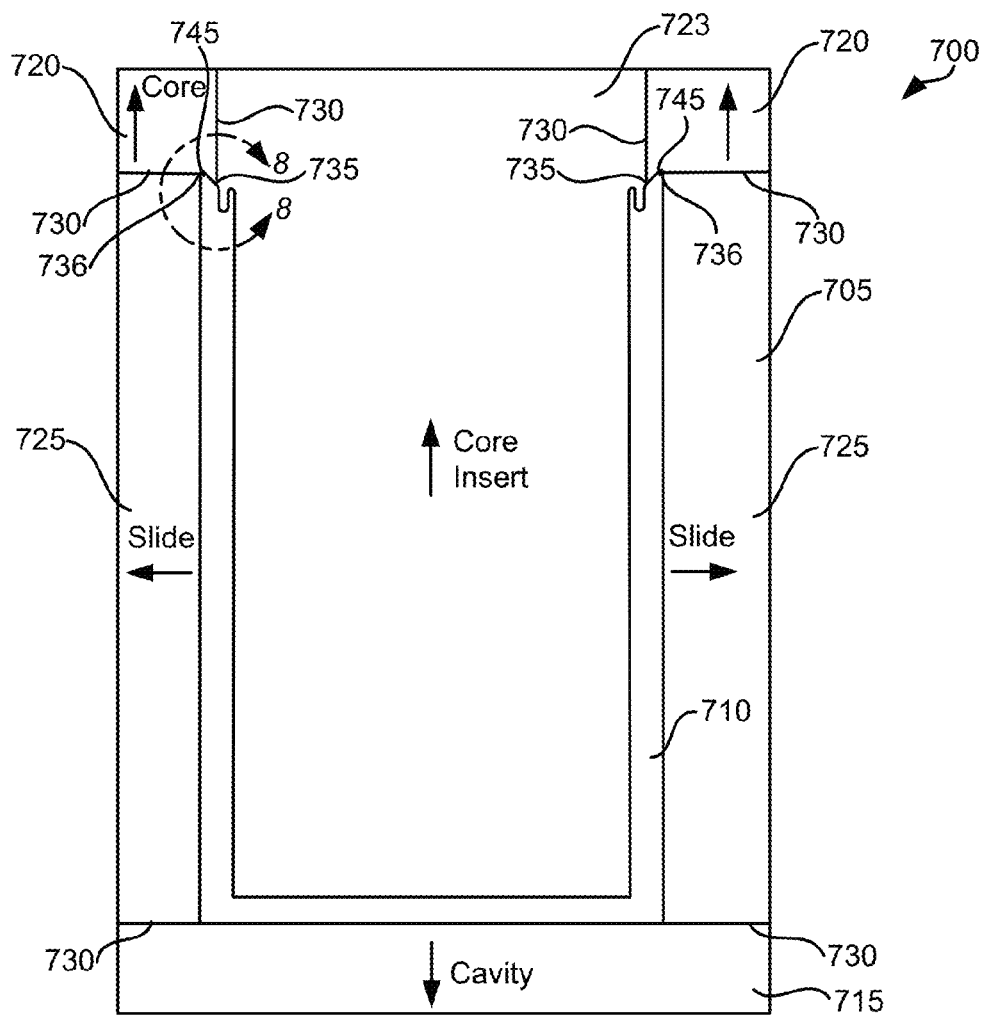
FIG. 7 is a cross-sectional view of an injection molding apparatus for forming a housing according to an embodiment of the disclosure.
Figure 8:
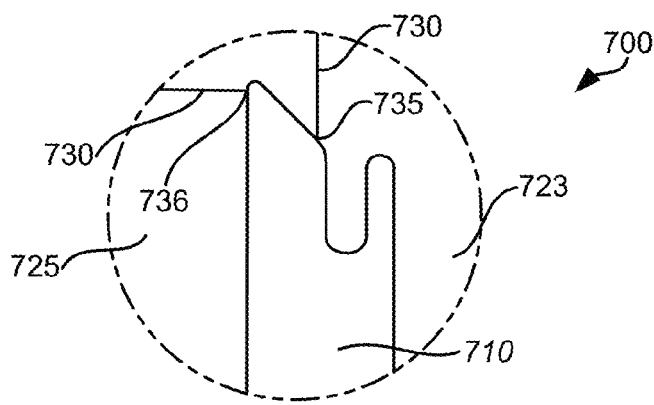
FIG. 8 is a close-up view of a portion of the injection molding apparatus illustrated in FIG. 7.

FIGS. 7-8 illustrate cross-sections of an injection molding apparatus 700 in accordance with various embodiments of the invention. As shown in FIG. 7, an injection mold tool 705 can be used to form a housing 710 that can be similar to housing 215 illustrated in FIG. 5. During formation of housing 710, injection mold tool 705 can form undesirable "parting lines" on housing 710 that can result in a disruptive exterior surface. However, as described herein, injection molding tool 705 can be configured to form the parting lines on regions of housing 710 that allow the completed enclosure to maintain a seamless appearance, as described in more detail below.

More specifically, in some embodiments injection mold tool 705 can involve the use of a cavity 715, a core 720, a core insert 723 and one or more metal slides 725 that meet at tooling interfaces 730 that can leave "parting lines" 735, 736 remaining on housing 710. In one example, cavity 715, a core 720 and one or more metal slides 725 are arranged so parting line 735 is formed on housing 710 just below curved tip 745 in a region that is covered by a cap (such as cap 210 illustrated in more detail in FIG. 5). In another example, parting line 736 is formed away from weld joint 270a (see FIG. 5) and below curved tip 745. More specifically, parting line 736 can be moved a sufficient distance away from curved tip 745, such that parting line 736 does not look or feel like a seam in the completed enclosure and the enclosure maintains a seamless appearance and feel.

Figure 9:
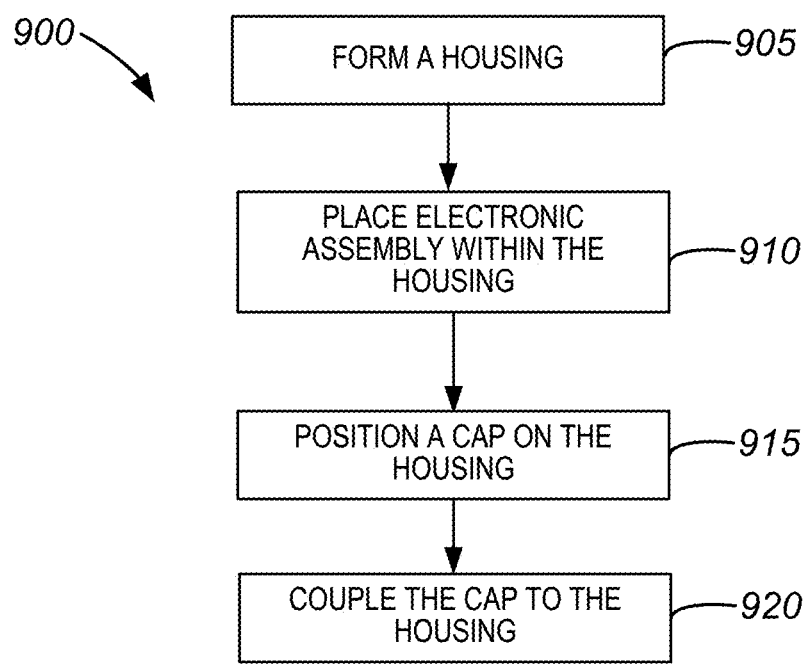
FIG. 9 is a method of forming an AC to DC adapter having an enclosure according to an embodiment of the disclosure.

FIG. 9 illustrates a method of forming an AC to DC adapter having a seamless enclosure. In step 905 a housing is formed. In some embodiments the housing has a bottom wall and at least one side wall extending from the bottom wall. The at least one side wall includes a beveled end portion having a curved tip. The bottom wall is formed around at least two electrical prongs extending through the bottom wall.

In step 910 an electronics assembly is placed within the housing. The electronics assembly is electrically coupled to the at least two electrical prongs. In step 915 a cap is positioned on the housing such that it encases the electronics assembly. The cap has a protrusion disposed around a peripheral edge. In step 920 the protrusion of the cap is coupled to the beveled end portion of the housing such that the cap, the bottom wall, and the at least one side wall define a cavity in which the electronic assembly is disposed. In some embodiments the cap is ultrasonically welded to the housing.

Although electronic devices 100 and 200 (see FIGS. 1 and 2, respectively) are described and illustrated as two particular electronic devices, embodiments of the disclosure are suitable for use with a multiplicity of electronic devices. For example, any device that encloses an electrical assembly can be used with embodiments of the invention In some instances, embodiments of the disclosure are particularly well suited for use with portable electronic devices because of the importance of their aesthetic appearance. As used herein, an electronic media device includes any device with at least one electronic component. Such devices can include, for example, portable music players (e.g., MP3 devices and Apple's iPod devices), portable video players (e.g., portable DVD players), cellular telephones (e.g., smart telephones such as Apple's iPhone devices), wireless routers, video cameras, digital still cameras, projection systems (e.g., holographic projection systems), gaming systems, PDAs, as well as tablet (e.g., Apple's iPad devices), laptop or other mobile computers. Some of these devices can be configured to provide audio, video or other data or sensory output.

For simplicity, various internal components, such as the AC to DC power conversion circuitry, bus, memory, storage device and other components of electronic devices 100 and 200 (see FIGS. 1 and 2A, respectively) are not shown in the figures.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. An enclosure for an electronic assembly, the enclosure having a seamless exterior appearance and comprising:
- a housing comprising a bottom wall and at least one side wall extending from the bottom wall, the at least one side wall comprising a beveled end portion having a curved tip;
- a cap comprising a protrusion coupled to the beveled end portion of the housing, wherein the cap, the bottom wall, and the at least one side wall define a cavity in which the electronic assembly is disposed;
- a first weld joint formed between the protrusion and the beveled end portion of the housing and a second weld joint formed between the housing and the cap, wherein the first and the second weld joints are separated by a non-interference region; and
- at least two electrical prongs extending through the bottom wall and electrically coupled to the electronic assembly.

2. The enclosure of claim 1, wherein the cap is coupled to the at least one side wall with a first and a second weld joint.

3. The enclosure of claim 1 wherein the housing has a generally rectangular cross-section and the at least one side wall comprises four sidewalls.

4. The enclosure of claim 1 wherein the housing has a round cross-section and the at least one side wall consists of a single sidewall.

5. The enclosure of claim 2, wherein the first and the second weld joints are separated by a distance and have a non-interference region between them.

6. The enclosure of claim 5, wherein the beveled end portion and the protrusion define the non-interference region with a pair of sloped surfaces.

7. The enclosure of claim 6, wherein the pair of sloped surfaces are both at an angle between 30 and 40 degrees.

8. The enclosure of claim 2, wherein the first weld joint is formed between the protrusion and the beveled end portion.

9. The enclosure of claim 2 wherein the second weld joint is formed within an interference region disposed between the side wall and the cap.

10. The enclosure of claim 2, wherein the first and the second weld joints are ultrasonically formed welds.

11. The enclosure of claim 1, wherein at least a portion of a top surface of the cap is proud with respect to the curved tip of the beveled end portion.

12. The enclosure of claim 1, wherein a top surface of the cap is formed with a matte surface.

13. A method of forming an enclosure having a seamless exterior appearance for an electronic assembly, the method comprising:
- forming a housing having a bottom wall and at least one side wall extending from the bottom wall, the at least one side wall comprising a beveled end portion having a curved tip, and the bottom wall being formed around at least two electrical prongs extending through the bottom wall;
- disposing the electronic assembly within the housing such that the electrical assembly is electrically coupled to the at least two electrical prongs;
- positioning a cap comprising a protrusion on the housing; and
- coupling the protrusion to the beveled end portion with a first joint and a second joint that are separated from each other by a non-interference region, wherein the cap, the bottom wall, and the at least one side wall define a cavity in which the electronic assembly is disposed.

14. The method of claim 13, wherein the protrusion is coupled to the beveled end portion with a first and a second joint.

15. The method of claim 14 wherein the first and the second joints are formed by ultrasonic welding.

16. The method of claim 15 wherein the second joint is formed by shear forces acting on an interference region disposed between the side wall and the cap.

17. The method of claim 15 wherein the second joint is formed by compression forces acting on an interference region disposed between the side wall and the cap.

18. The method of claim 14 wherein the first joint is formed by ultrasonic welding and the second joint is formed with an adhesive.

19. The method of claim 14, wherein the first and the second joints are separated by a distance and have a non-interference region between them.

20. The method of claim 19, wherein the beveled end portion and the protrusion define the non-interference region with a pair of sloped surfaces.

21. The method of claim 20, wherein the pair of sloped surfaces are both at an angle between 30 and 40 degrees.

22. The method of claim 13, wherein at least a portion of a top surface of the cap is proud with respect to the curved tip of the beveled end portion.

* * * * *